United States Patent
Dyson et al.

(10) Patent No.: US 9,729,374 B2
(45) Date of Patent: Aug. 8, 2017

(54) CO-CHANNEL SPATIAL SEPARATION USING MATCHED DOPPLER FILTERING

(71) Applicant: HARRIS CORPORATION, Melbourne, FL (US)

(72) Inventors: Timothy F. Dyson, Melbourne, FL (US); Rodney K. McPherson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/820,709

(22) Filed: Aug. 7, 2015

(65) Prior Publication Data
US 2017/0041175 A1 Feb. 9, 2017

(51) Int. Cl.
*H04L 27/26* (2006.01)
*G08G 3/02* (2006.01)
(Continued)

(52) U.S. Cl.
CPC ........... *H04L 27/2649* (2013.01); *G08G 3/02* (2013.01); *H04L 1/0045* (2013.01);
(Continued)

(58) Field of Classification Search
CPC ..... H04L 27/38; H04L 25/061; G01S 13/723; G01S 3/7864; G01S 13/227;
(Continued)

(56) References Cited

U.S. PATENT DOCUMENTS

| 4,776,035 A | 10/1988 | Duggan |
| 5,784,293 A | * 7/1998 | Lipa ........................ H04B 1/707 370/431 |

(Continued)

FOREIGN PATENT DOCUMENTS

| DE | EP 1351413 | 4/2006 |
| DE | 102012110384 A1 | 4/2014 |

OTHER PUBLICATIONS

Guo, S., "Space-Based Detection of Spoofing AIS Signals Using Doppler Frequency," Multisensor, Multisource Information Fusion: Architectures, Algorithms, and Applications 2014, Proc. of SPIE vol. 9121, 912108 © 2014 SPIE CCC Code: 0277-786X/14; doi: 10.1117/12.2050448.

(Continued)

*Primary Examiner* — Janice Tieu
(74) *Attorney, Agent, or Firm* — Fox Rothschild LLP; Robert J. Sacco; Carol E. Thorstad-Forsyth

(57) ABSTRACT

Systems (100) and methods for co-channel separation of communication signals. The methods involve: simultaneously receiving a plurality of communication signals transmitted at disparate relative Doppler frequencies from different locations within a multi-access system; performing matched filtering operations to pre-process each of the plurality of communication signals so as to generate pre-processed digitized samples using a priori information contained in pre-ambles (302, 304) of messages present within the plurality of communication signals; using estimated signal parameters to detect the plurality of communication signals from the pre-processed digitized samples; and demodulating the plurality of communication signals without using a Viterbi decoder.

16 Claims, 6 Drawing Sheets

(51) Int. Cl.
  *H04L 25/03* (2006.01)
  *H04L 25/06* (2006.01)
  *H04L 1/00* (2006.01)
  *H04L 5/00* (2006.01)

(52) U.S. Cl.
  CPC .......... *H04L 1/0061* (2013.01); *H04L 5/0058* (2013.01); *H04L 25/03057* (2013.01); *H04L 25/03203* (2013.01); *H04L 25/03318* (2013.01); *H04L 25/067* (2013.01)

(58) Field of Classification Search
  CPC ...... G01S 13/5244; G01S 13/72; G01S 13/86; G01S 13/9307; G01S 1/68; G01S 5/0018; G01S 7/292; G01S 7/295; G01S 7/414
  See application file for complete search history.

(56) References Cited

U.S. PATENT DOCUMENTS

| | | | |
|---|---|---|---|
| 5,926,467 | A | 7/1999 | Hershey et al. |
| 7,545,854 | B1 | 6/2009 | Gronemeyer |
| 7,809,370 | B2 | 10/2010 | Stolte et al. |
| 8,013,733 | B1 | 9/2011 | Vallaire |
| 8,275,077 | B1 | 9/2012 | Nelson |
| 8,374,292 | B2 * | 2/2013 | Peach ................ H04B 7/18513 375/150 |
| 8,665,997 | B1 | 3/2014 | Smith |
| 8,693,587 | B2 | 4/2014 | Giraud et al. |
| 8,750,429 | B2 | 6/2014 | Jones |
| 8,970,426 | B1 | 3/2015 | Stockmann et al. |
| 2006/0269017 | A1 * | 11/2006 | Beadle ................ H04B 1/7156 375/343 |
| 2009/0167536 | A1 | 7/2009 | Clark et al. |
| 2011/0075602 | A1 * | 3/2011 | Peach ....................... G01S 1/68 370/326 |
| 2011/0207398 | A1 | 8/2011 | Calmettes et al. |
| 2012/0007750 | A1 | 1/2012 | Gorabi et al. |
| 2013/0093625 | A1 | 4/2013 | Smith |
| 2014/0218217 | A1 | 8/2014 | Calvar Anton et al. |
| 2016/0012472 | A1 | 1/2016 | Nagaswami |
| 2016/0054425 | A1 | 2/2016 | Katz |

OTHER PUBLICATIONS

Faragher, R., et al., "Spoofing Mitigation, Robust Collision Avoidance, and Opportunistic Receiver Localisation Using a New Signal Processing Scheme for ADS-B or AIS," Proceedings of the 27th International Technical Meeting of the Satellite Division of the Institute of Navigation (ION GNSS+ 2014), Sep. 8-12, 2014, Tampa Convention Center, Tampa, Florida.

Papi, F., et al., "Radiolocation and Tracking of Automatic Identification System Signals for Maritime Situational Awareness," Published in IET Radar, Sonar & Navigation, 2015, vol. 9, iss. 5, pp. 568-580, doi: 10.1049/iet-rsn. 2014.0292, © The Institution of Engineering and Technology 2015.

Petkus, Eric, "Optimizing a Global Satellite Constellation for AIS and Maritime Domain Awareness," http://cdn2.hubspot.net/hubfs/183611/CollateralforDownload/exactView RT Whitepaper.pdf, published Jun. 2, 2015, D0777.

Larsen, J.A., et al., "An SDR Based AIS Receiver for Satellites," Recent Advances in Space Technologies (RAST), 2011 5th International Conference, pp. 526, 531, Jun. 9-11, 2011; ISBN: 978-1-4244-9617-4; DOI: 10.1109/RAST.2011.5966893.

Picard, M., et al., "An adaptive mutli-user multi-antenna receiver for satellite-based AIS detection," Advanced Satellite Multimedia Systems Conference (ASMS)_ and 12th Signal Processing for Space Communications Workshop (SPSC), 2012, pp. 273, 289, Sep. 5-7, 2012, ISBN: 978-1-4673-2676-6, DOI: 10.1109/ASMS-SPSC.2012.63333088.

Prevost, R., et al., "Partial CRC-assisted error correction of AIS signals received by satellite," Acoustics, Speech and Signal Processing (ICASSP), 2014 IEEE International Conference, pp. 1951, 1955, May 4-9, 2014; DOI: 10.1109/CASSP.2014.6853939.

Gallardo, M.J., et al., "Coherent receiver for AIS Satellite Detection," Communications, Control and Signal Processing (ISCCSP), 2010 4th International Symposium, pp. 1-4, Mar. 3-5, 2010, ISBN: 978-1-4244-6285-8; DOI: 10.1109/ISCCSP.2010.5463417.

Duel-Hallen, A., et al., "Delayed Decision-Feedback Sequence Estimation," IEEE Transactions on Communications, vol. 37, No. 5, May 1989.

Eyuboglu, M.V., et al., "Reduced-State Sequence Estimation with Set Partitioning and Decision Feedback," IEEE Trasnactions on Communications, vol. 36, No. 1, Jan. 1988.

\* cited by examiner

CO-CHANNEL SPATIAL SEPARATION
USING MATCHED DOPPLER FILTERING

BACKGROUND OF THE INVENTION

Statement of the Technical Field

This document relates to co-channel spatial separation and non-coherent detection of communication signals. More particularly, this document concerns co-channel spatial separation and non-coherent detection of communication signals using matched Doppler filtering and non-coherent demodulation and equalization techniques.

Description of the Related Art

Automatic Identification Systems ("AISs") are well known in the art. The AISs typically allow vessels (e.g., ships) to view and track marine traffic in a surrounding area. AISs have many applications. For example, AISs can be employed for collision avoidance, fishing fleet monitoring and control, vessel traffic services, maritime security, navigation services, search and rescue, accident investigation, and fleet and cargo tracking.

In this regard, an AIS is an automatic tracking system used on ships and by Vessel Traffic Services ("VTSs") for identifying and locating vessels in a given geographic area or around the globe. A vessel's identification and location are tracked by exchanging data with other nearby vessels, AIS base stations and satellites. The vessel's identification and location are displayed in an AIS chartplotter or other Graphical User Interface ("GUI") viewable on a display screen. The AIS chartplotter and other GUIs facilitate collision avoidance amongst a plurality of vessels in proximity to each other. Other information may also be displayed on the display screen, such as a vessel's position, course and/or speed.

The vessels comprise AIS transceivers which automatically and periodically transit vessel information. The vessel information includes, but is not limited to, vessel name, position, speed and navigational status. The vessel information can be used to track the vessel by the AIS base stations and/or satellites. The AIS transceivers comprise a Very High Frequency ("VHF") transceiver and a positioning system (e.g., a Global Positioning System ("GPS")). The VHF transceiver has a VHF range of about 10-20 nautical miles. The VHF transceiver operates in accordance with a Time Division Multiple Access ("TDMA") scheme. The AIS base stations and satellites comprise AIS receivers, and therefore can receive AIS data but are unable to transmit their own locations to the vessels. The AIS receivers also operate in accordance with the TDMA scheme.

Recently, global AIS data has been made available on the internet. The global AIS data comprises data collected from satellites and internet-connected shore-based stations. The global data include vessel names, details, locations, speeds, and headings. The global data is displayed on a publically accessible map showing the relative locations of vessels around the globe.

SUMMARY OF THE INVENTION

This disclosure concerns systems and methods for co-channel separation and non-coherent detection of communication signals. The methods involve: simultaneously receiving a plurality of communication signals transmitted at disparate relative Doppler frequencies from different locations within a multi-access system; performing matched filtering operations to pre-process each of the plurality of communication signals so as to generate pre-processed digitized samples using a priori information contained in pre-ambles of messages present within the plurality of communication signals; using estimated signal parameters to detect the plurality of communication signals from the pre-processed digitized samples; and demodulating the plurality of communication signals using a non-coherent Reduced Complexity Sequence Estimation ("RSSE") approach without using a classical full-state Viterbi equalizer. In the limit of simplicity, the non-coherent RSSE approach can take the form of a non-coherent Decision Feedback Equalizer ("DFE").

In some scenarios, the pre-processed digitized samples are generated by estimating at least one of the following signal parameters: a signal's Time Of Arrival ("TOA"); a Doppler frequency; a phase; and a Signal-to-Noise Ratio ("SNR"). The estimated signal parameters are determined using the a priori information contained in the pre-ambles of the messages. The a prior information comprises a training sequence and a start flag of an AIS message. The matched filtering operations for signal acquisition are performed in the frequency domain. A Constant False Alarm Rate ("CFAR") technique is used to detect the plurality of communication signals from the pre-processed digitized samples.

The communication signals are demodulated using an RSSE or DFE technique. The RSSE/DFE techniques involve: match filtering each signal of the plurality of communication signals; de-rotating each signal to a real axis; whitening filtering each signal; non-coherently equalizing each signal; and determining hard decisions and soft decisions about binary bits contained in each signal. The soft decisions are used for error correction. The demodulating is performed by a number of demodulators that is less than that required to span an entire channel instantaneous bandwidth. The term "RSSE", as used herein, generally refers to a flexible and configurable approach and methods that can realize reduced complexity sequence estimation methods sometimes referred to in the technical literature as RSSE or Delayed Decision Feedback Sequence Estimation ("DD-FSE").

BRIEF DESCRIPTION OF THE DRAWINGS

Embodiments will be described with reference to the following drawing figures, in which like numerals represent like items throughout the figures, and in which.

DETAILED DESCRIPTION

Figure 1:
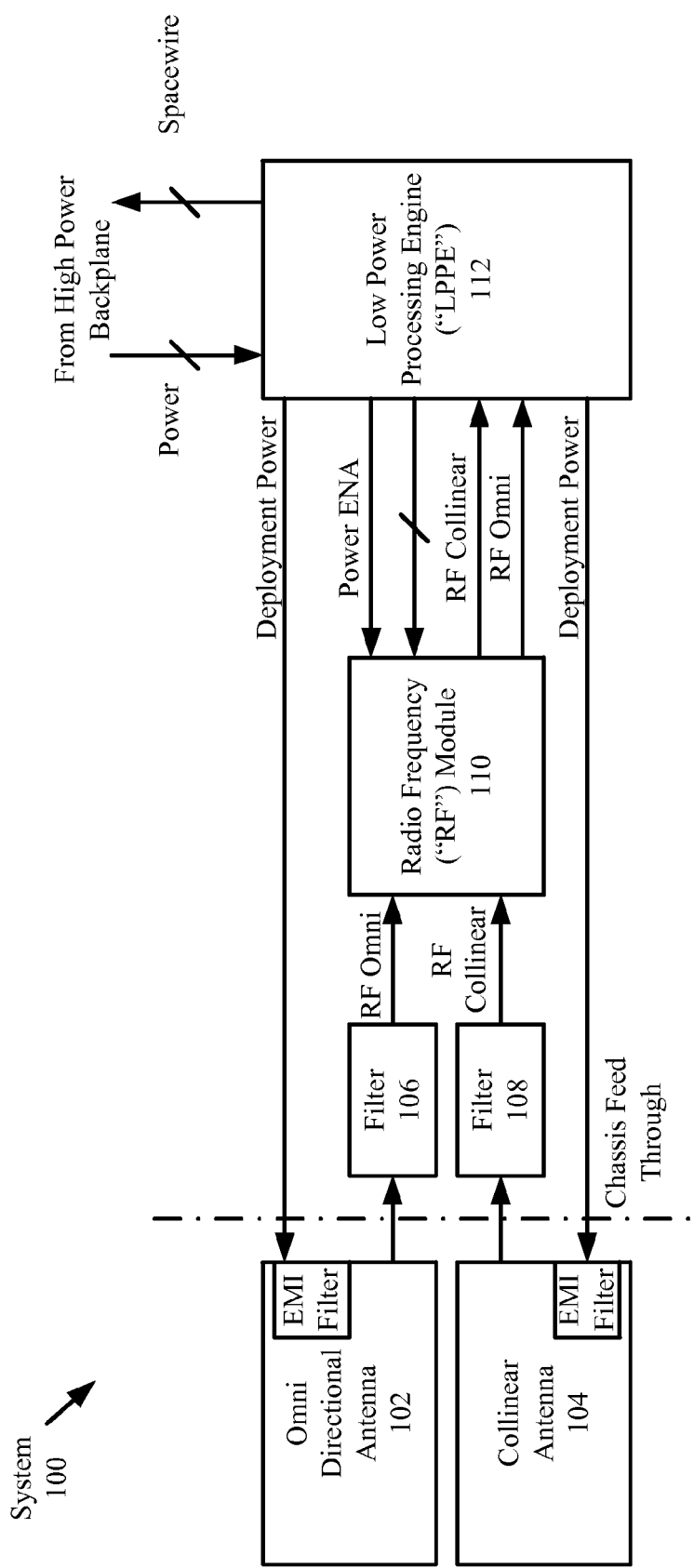
FIG. 1 is an illustration of an exemplary receiver.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present document generally concerns co-channel spatial separation and non-coherent detection of communication signals using matched Doppler filtering. The co-channel spatial separation is discussed herein in relation to AIS applications. However, the co-channel spatial separation can be employed for other types of applications. For example, the co-channel spatial separation can be employed in Digital Selective Calling ("DSC") applications and VHF Data Exchange System ("VDES") applications.

AIS was not designed to support a ship-to-space link. Ships form self-organizing Time Division Multiple Access ("TDMA") cells. TDMA is a channel access method for shared medium networks. TDMA is used in ASI systems to allow several users to share the same frequency channel by dividing the frequency channel into a plurality of time slots. A TDMA cell is a geographical area covered by an AIS transmitter. From space, several TDMA cells can be seen. Adjacent TDMA cells induce significant co-channel interference. To separate the TDMA cells, diversity is needed. The diversity is provided using Doppler filtering to form virtual spatial separation between adjacent TDMA cells.

Conventional AIS systems employ AIS demodulation. AIS demodulation involves demodulating two simultaneously received signals transmitted from different locations within a multiple access system (e.g., from two or more vessels). In some scenarios, the AIS demodulation is achieved using a Viterbi demodulation technique based on a smallest aggregate metric [E]. Viterbi demodulation is well known in the art, and therefore will not be described herein. One of the metrics can be a Doppler metric (e.g., a phase metric, a frequency metric, etc.). In other scenarios, the demodulation is achieved using a Polyphase rake receiver approach with matched filters and Viterbi demodulation. The Polyphase rake receiver is not used for Doppler recovery. Polyphase rake receivers are well known in the art, and therefore will not be described herein.

The present disclosure concerns a novel High Performance ("HP") receiver for a Size Weight and Power ("SWaP") constrained system. The HP receiver is generally configured to: (1) simultaneously receive a plurality of communication signals transmitted at disparate relative Doppler frequencies from different locations within a multiple access system (e.g., from two or more vessels); (2) detect the communication signals; (3) characterize the communication signals; and (4) demodulate the communication signals without using a classical full-state Viterbi algorithm. A classical full-state Viterbi equalizer or decoder uses a Viterbi algorithm for decoding a bitstream that has been encoded using a convolutional code or otherwise evolves from an underlying Hidden Markov model and can be represented as evolving upon a finite state Trellis. The encoded bitstream is demodulated herein using an RSSE based demodulator, also based on a finite reduce state Trellis, or a non-coherent DFE demodulator.

Steps (2)-(4) involve: performing pre-processing operations by a matched filter to generate a plurality of pre-processed digitized samples by estimating a signal's TOA, a Doppler frequency, a phase, and/or an SNR using a priori training information contained in the received AIS messages; time delaying the pre-processed digitized samples; using the estimated signal parameters for time aligning and frequency tuning to detect the AIS signal from the pre-processed digitized samples; and using a non-coherent demodulator to recover the transmitted information. Notably, the number of demodulators is less than would be required to span the entire channel instantaneous bandwidth.

Referring now to FIG. 1, there is provided an illustration of an exemplary receiver that is useful for understanding the present invention. Receiver 100 is generally configured to receive, process and report various maritime mobile band channel traffic. The primary channels of interest are the AIS channels and Application Specific Message ("ASM") channels as defined within the maritime mobile radio VHF allocation.

As shown in FIG. 1, the receiver 100 comprises two antennas, namely an omni-directional antenna 102 and a collinear antenna 104. The receiver 100 also comprises filters 106, 108, a Radio Frequency ("RF") module 110 and a Low Power Processing Engine ("LPPE") 112. Each of the listed components is well known in the art, and therefore will not be described herein. However, it should be understood that components 106-110 collectively perform impedance matching, amplification and filtering to isolate the maritime mobile radio band and insure adjacent channel VHF energy rejection to at least 60 dBc relative to individual maritime mobile 25 Hz channel communications. The isolated spectrum is passed to the LPPE 112 for direct Analog-to-Digital ("A/D") data conversion to generate digitized samples. The digitized samples are then processed to detect, characterize and demodulate a plurality of communication channels (e.g., 6 communication channels) so as to obtain AIS messages contained therein. The manner in which the detection, characterization and demodulation are achieved is described in detail below in relation to signal processing. The signal processing generally involves co-channel spatial filtering and actual demodulation of the AIS messages in orbit (e.g., by a satellite).

In some scenarios, the signal processing is entirely performed in firmware of the LPPE 112. In this regard, the LPPE 112 is implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted, arranged and/or programmed to perform one or more of the methodologies, procedures, or functions described herein.

Figure 2:
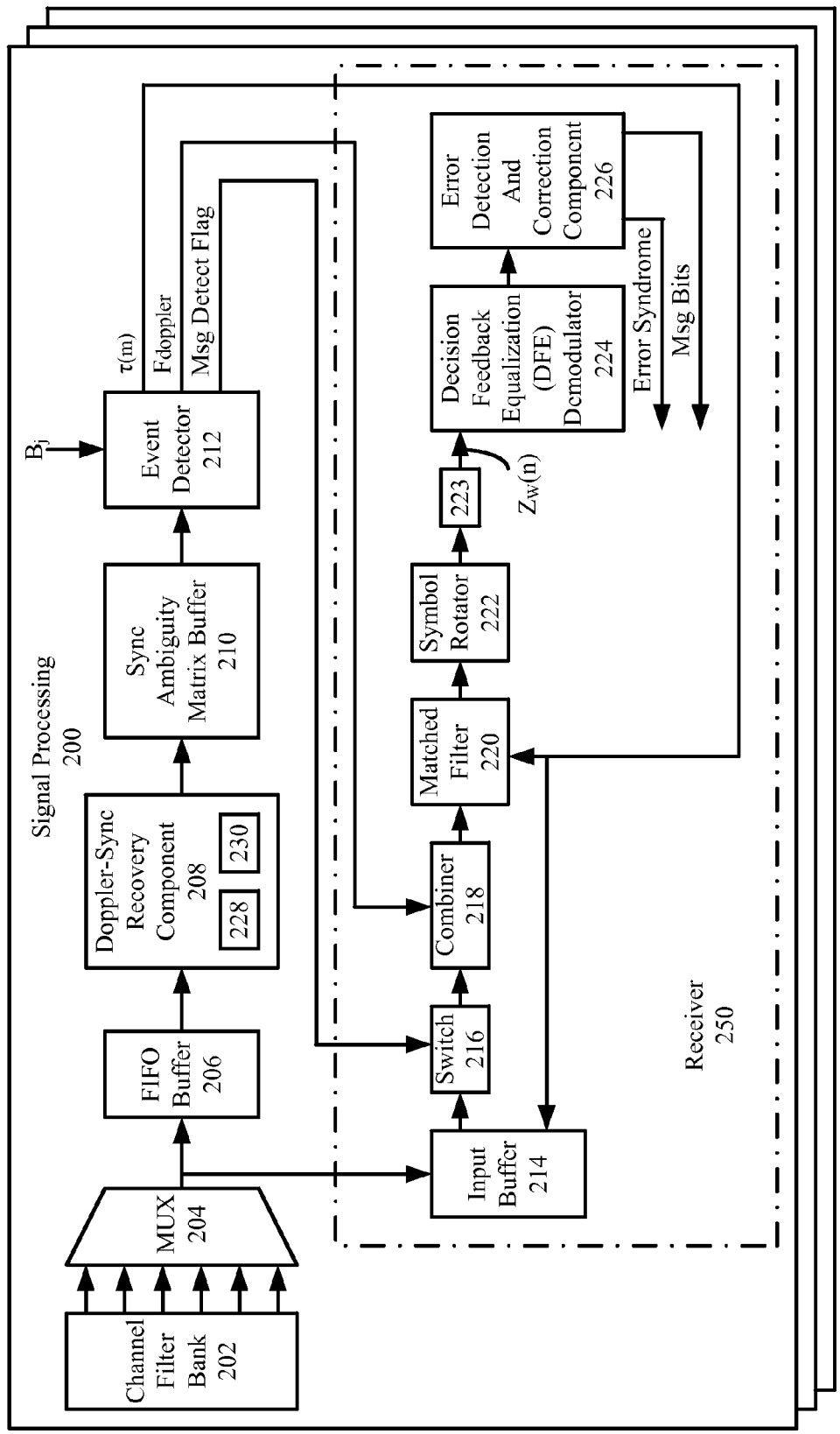
FIG. 2 is an illustration that is useful for understanding signal processing.

Referring now to FIG. 2, there is provided an illustration that is useful for understanding the signal processing 200 performed by the LPPE 112. The signal processing 200 provides for a high performance receiver 250 that can be used in a SWaP constrained system. The signal processing generally involves on-board demodulation of simultaneously received signals transmitted from different locations of a multi-access system (e.g., from different vessels) without use of a classical full-state Viterbi equalizer (e.g., a maximum likelihood sequence estimator). Notably, the classical full-state Viterbi equalizer is much more complex as compared to the equalizing technique employed herein. The equalizing decoding technique employed herein allows detection to be achieved with less power, lower complexity, and fewer resources as compared to classical full-state Viterbi based equalization.

Signal discernment in co-channel interference processing 200 is achieved using an overlap-save Doppler filter bank. The Doppler filter bank comprises a plurality of matched filters arranged in parallel. Each matched filter is matched to a waveform spectral occupancy, but shifted in frequency. Accordingly, in some scenarios, a first matched filter is provided for a first channel having a first frequency. A second matched filter is provided for a second channel having a second different frequency, and so on. The signal input to all of the matched filters is the same. The matched filtering is performed in the frequency domain.

Figure 3:
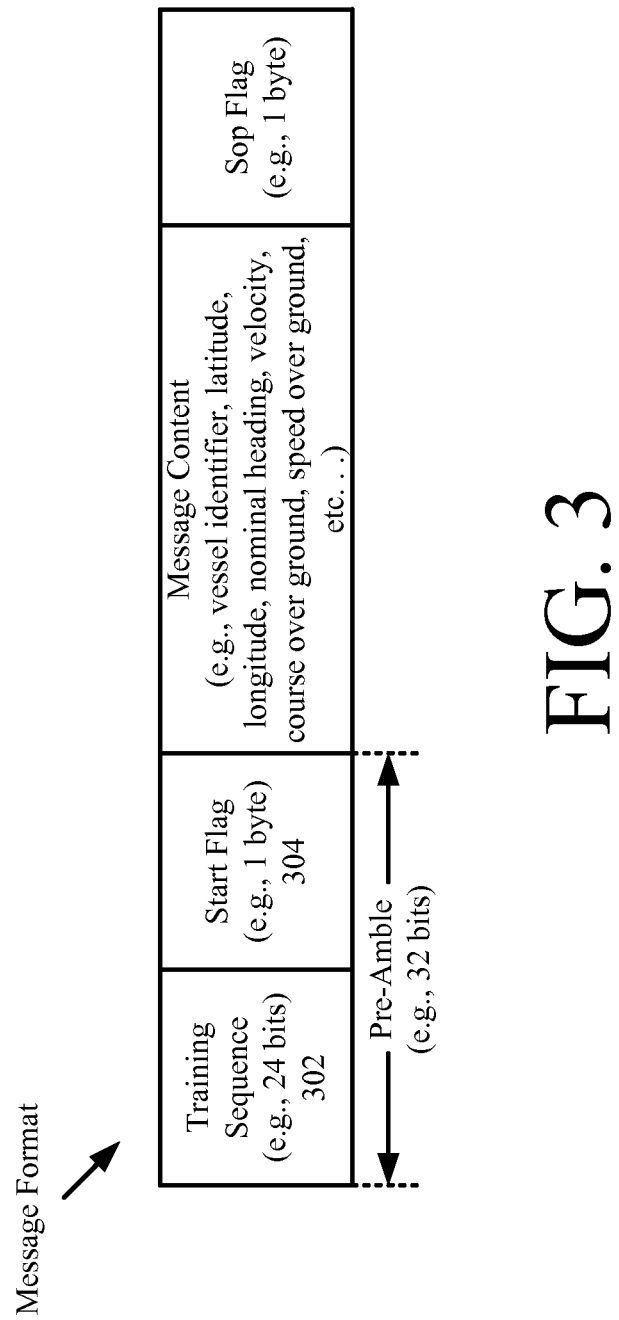
FIG. 3 is an illustration of an exemplary AIS message with a pre-amble comprising a training sequence.

As a result of the matched filtering, the input signal is matched to a particular part of an AIS message which is known. This part of the AIS message is referred to herein as a pre-amble. As shown in FIG. 3, the pre-amble comprises a training sequence 302 and a start flag 304. Notably, there are M (e.g., 4) distinct possibilities for the pre-amble of an AIS message. As such, the signal processing 200 shown in FIG. 2 is simultaneously performed M number of times so as to account for the M possible variations of the pre-amble of an AIS message.

Once the input signal has been filtered by the matched filter, a determination is made as to whether or not a transmitted AIS signal is present on each channel. This determination is made using a CFAR technique to detect a peak of energy output from a respective matched filter. CFAR techniques are well known in the art, and therefore will not be described in detail herein. Still, it should be noted that CFAR is an adaptive algorithm to detect target energy amongst background noise and co-channel clutter. This detection is achieved by comparing the peak energy to an estimated background noise energy level. The result of the CFAR algorithm is a plurality of points believed to be related, and therefore likely represent a transmitted signal. The plurality of points is referred to herein as a cluster of points.

Next, time and frequency estimation operations are performed using the peak and cluster of points. The time and frequency estimation operations are performed to derive a message arrival time estimate and a Doppler frequency estimate. Algorithms for estimating an arrival time and Doppler frequency are well known in the art. Any known or to be known algorithm can be used herein without limitation. For example, a linear time estimation and a polynomial frequency estimation algorithm can be employed.

As a result of performing the above matched filter, peak detection, time estimation and frequency estimation operations, a list is generated identifying potential received AIS messages of interest. The list includes, but is not limited to, a start time for the potential received massages and the Doppler frequency associated with the potential received AIS messages.

Subsequently, demodulation operations are performed. In some scenarios, the demodulation operations include DFE demodulation operations, which can be viewed as a special case of RSSE at its simplistic extreme. The DFE demodulation operations generally involve: Doppler correction; match filtering each signal; de-rotating each symbol to a real axis; whitening filtering each signal; non-coherently demodulating the signals; determining hard decisions about the binary bits (i.e., +1, −1 or 0, 1); and determining soft decisions about the binary bits; and using the soft decisions for error correction purposes. The error correction may be achieved using a Cyclic Redundancy Check ("CRC") based algorithm and/or an Error Detection And Correction ("EDAC") based algorithm. CRC and EDAC based algorithms are well known in the art, and therefore will not be described herein.

Referring again to FIG. 2, the signal processing 200 begins with signal filtering operations performed by a channel filter bank 202. As noted above, system 100 monitors the maritime mobile VHF band in space. The maritime mobile VHF band is approximately 6 MHz wide with approximately 108 potential channels. A number of the 108 channels (e.g., 6 channels) are currently assigned for use by an AIS system to primarily coordinate navigation. These channels are referred to as AIS transmission channels. The channel filter bank 202 analyzes the entire maritime mobile VHF band to detect the AIS transmission channels therein. Signals associated with the detected AIS transmission channels are passed to a multiplexer 204. The multiplexer 204 selects two of the AIS transmission channels for subsequent in a single instance of the signal processing. The information signals conveyed on the selected two AIS transmission channels are passed to a First-In-First-Out ("FIFO") buffer 206 and an input buffer 214.

The output of the FIFO buffer 206 is passed to a Doppler-Sync recovery component 208. The Doppler-Sync recovery component 208 simultaneously processes the two selected information signals. The Doppler-Sync recovery component 208 implements a Dopplerized pre-amble sequence maximum likelihood detection/rake receiver for the four possible pre-amble sequence encodings that distinguish the beginning of an AIS transmission. A Frequency-Domain Overlap-Save ("FDOS") cross-correlator 228 is employed for each of the four pre-amble ambiguities across a plurality of Dopplerized matched filters 230 (e.g., 71 Dopplerized matched filters). A linear energy envelope of the resulting pre-amble pattern correlations is used to (a) estimate a noise reference floor and (b) determine the most likely AIS message for subsequent screening. The overall context for this processing relative to the general AIS receiver concept is shown in FIG. 2.

Figure 4:
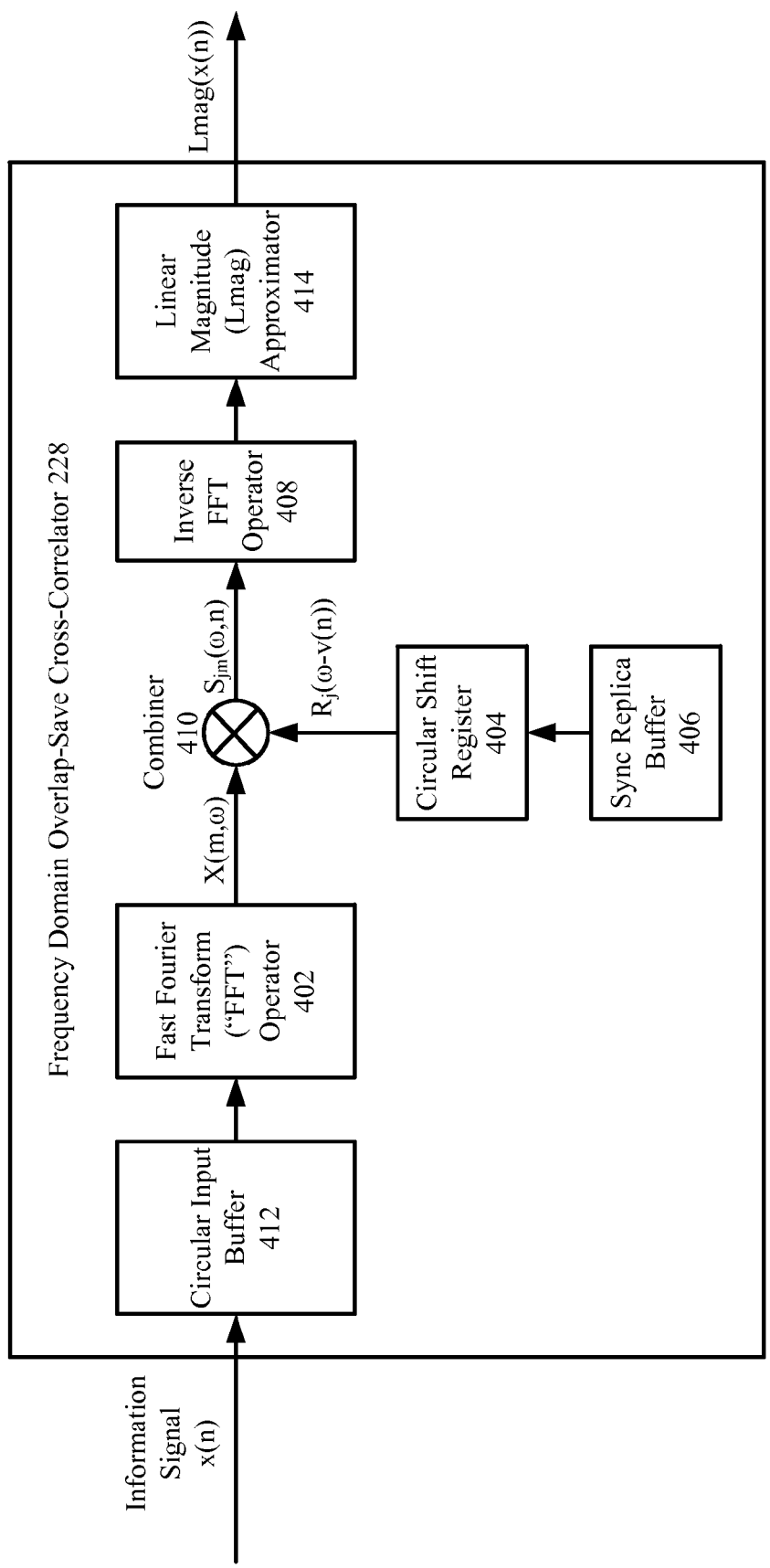
FIG. 4 is an illustration of a cross-correlator.

The pre-amble pattern correlation is achieved in three steps: an overlap-save correlation step; an envelope detection step; and an AIS message peak detection step for Ambiguity pointers. In some scenarios, the overlap-save correlation step and the envelope detection step is performed by the FDOS cross-correlator 228. An illustration of the FDOS cross-correlator 228 is provided in FIG. 4. As shown in FIG. 4, the FDOS cross-correlator 228 comprises a circular shift register 412, a Fast Fourier Transform ("FFT")

operator 402, a circular shift register 404, a sync replica buffer 406, an inverse FFT ("IFFT") operator 408, and a Linear magnitude ("LMag") approximator 414.

The FFT operator 402 and the IFFT operator 408 implement FFT and IFFT algorithms. FFT and IFFT algorithms are well known in the art. Any known or to be known FFT and/or IFFT algorithm can be used herein. For example, in some scenarios, a mixed-radix FFT is employed that uses a radix decomposition of N=8*4*4*4.

In some scenarios, the FFT operator 402 is a 512 point FFT using a 50% time overlap in the forward direction. One FFT is performed for each successive 256 points added to the circular shift buffer 412. The resulting spectrum X(m,ω) is then used to form the Doppler cross-spectra $S_{jm}(\omega,n)$ with each of the four pre-amble pattern states. The Doppler cross-spectra $S_{jm}(\omega,n)$ is defined by the following mathematical equation (1).

$$S_{jm}(\omega,n) = X(m,\omega)R_j(\omega - v(n))/2^{Bs} \quad (1)$$

where ω represents a frequency index or bin, n represents a Doppler channel or bin, v(n) represents an nth frequency shift amount to produce and nth Doppler filter, j represents one of the four ambiguity states of the pre-amble, and m represents a time batch index of an input data block (e.g., an overlapped 512 time samples of a physical channel being processed). In some scenarios, n can have a value falling with the range −35, . . . 0, . . . , 35. j can have a value falling within the range 1, . . . , 4. m can have a value falling within the range 1, . . . , 5.

Bs represents a normalization factor for the cross-spectrum calculation based on the Received Signal Strength ("RSS") normalization and integer scaling of the reference spectral replica data R(ω). The reference spectral replica data R(ω) is defined by the following mathematical equation (2).

$$R(\omega) = \text{round}(2^{C}\cdot(\hat{R}(\omega)/\sqrt{|\hat{R}(\omega)|^2}) \quad (2)$$

This scaling can use Bs=8, where Bs is not equal to C.

As each Doppler cross-spectra $S_{jm}(\omega,n)$ is created, it is Inverse Fast Fourier Transformed ("IFFT"). In some scenarios, the first 256 samples of the resulting time series are saved converted into an Lmag by the LMag approximator 414. The LMag approximator 414 uses an LMag approximation algorithm in a sliding buffer. The LMag approximation algorithm is defined by the following mathematical equations (3).

$$\text{LMag}(x(n)) = \text{rnd}((ca(|\text{real}(x(n))|+|\text{imag}(x(n))|)+cb(||\text{real}(x(n))|-|\text{imag}(x(n))||))/4096) \quad (3)$$

where x(n) refers to a sample of a resulting time series, ca is a constant and cb is a constant. In some scenarios, ca=2744 and cb=1139.

Referring again to FIG. 2, the result of the pre-amble detection correction (i.e., LMag(x(n)) output from the Doppler-Sync recovery component 208) is passed to the event detector 212 via the sync ambiguity matrix buffer 210. The sync ambiguity matrix buffer 210 consists of a plurality of pointer vectors PV for each pre-amble state. Each pointer vector PV is defined by mathematical equation (4).

$$PV = \{A_-(j,p), A_0(j,p), A_+(j,p), d(j,p), t(j,p)\} \quad (4)$$

where A(j,p) is u18.0, d(p) is s6.0, and t(p) is u11.0 (i.e., 90 bits per vector).

The event detector 212 performs the AIS message peak detection step. The event detector 212 has a first input from the sync ambiguity matrix buffer 210 and a second input B(m) representing a background reference level for each pre-amble state (x) and each Doppler bin (j) at time sample 'm'. The output of the event detector 212 is a pending AIS message list of potential AIS message parameters for processing by the receiver 250. Each list entry consists of: an AIS message detect flag; a start time τ(m) for a suspected AIS message; a Doppler frequency $F_{doppler}$ for the suspected AIS message; a pre-amble state associated with the suspected AIS message; and/or a normalized peak energy A(m) of the suspected AIS message pre-amble correlation.

The event detector 212 operates on the suspected AIS messages stored in the sync ambiguity matrix buffer 210. The event detector 212 applies a Constant False Alarm Rate ("CFAR") like thresholding and a proximity screening in peak amplitude order. An exemplary implementation of the AIS message peak detection algorithm employed by the event detector 212 is provided below.

---

M = 0
l = 0
for l = 1:$N_{pre}$
  [$j_x$, $m_x$] = argmax$_{(j,m)}$[$A_0(j,m) - K_D B_{jx}(d(j,m))$]
  Ã = $A_0(j_x,m_x) - K_D B_{jx}(d(j_x,m_x))$
  if Ã > 0
    M = M + 1
    A(M) = Ã
    τ(l) = t($j_x,m_x$)
    STATE(M) = $j_x$
    dopp(M) = d($j_x,m_x$) + QuadFit($A_0(j_x,m_x), A_0(j_x,m_x), A_0(j_x,m_x)$)
    for all (0 < |t(j,m) − τ(M)| < $K_t$ and 0 < |d(j,m) − dopp(M)| < $K_{dp}$)
      $A_0(j,m)$ = 0
    end
  else
    $A_0(j_x,m_x)$ = 0
  end
end

---

$K_D$, $K_t$ and $K_{dp}$ are configuration parameters. In some scenarios, the default values for $K_D$, $K_t$ and $K_{dp}$ are respectively 3.25, 25 samples and 1000 Hz. In one instance, the QuadFit function implements a quadratic interpolation of a Doppler offset according to mathematical equation (5).

$$\text{QuadFit}(A_o, A_+, A_-) = \text{round}\left[1024\left(\frac{A_- - A_+}{2(A_+ + A_- - 2A_0)}\right)\right] \quad (5)$$

where a true channel offset frequency to be corrected by dopp(l) is interpreted as 150* dopp(l) Hz.

The outputs of the event detector 212 are communicated to the receiver 250. As noted above, these outputs include an AIS message detect flag; a start time τ(m) for a suspected AIS message; and a Doppler frequency $F_{doppler}$ for the suspected AIS message.

Referring again to FIG. 2, the receiver 250 is implemented as a non-coherent RSSE based demodulator. In some scenarios, the receiver 250 takes the form of a non-coherent DFE demodulator. The DFE demodulation is applied after matched filtering, symbol de-rotation, and channel pre-whitening. As such, the receiver 250 comprises an input buffer 214, switch 216, combiner 218, matched filter 220, symbol rotator 222, a whitening filter 223, a DFE demodulator 224 and an EDAC component 226. The input buffer 214 generally acts as a delay for the received signal while the components 206-212 perform their operations.

As shown in FIG. 2, the AIS message detect flag is forwarded from the event detector 212 to a switch 216. The switch 216 ensures that the receiver 250 only performs signal processing when a suspected AIS message was detected by the components 208-212. Accordingly, switch 216 is normally in an open state. The switch 216 transitions to its closed state when the AIS message detect flag indicates that a suspected AIS message was detected. When the switch 216 closes, a received signal is sent to the combiner 218 where the received AIS signal is Doppler frequency de-rotated or phase adjusted so as to form a Doppler de-rotated signal. Thereafter, the Doppler de-rotated signal is sent to the matched filter 220.

The matched filter 220 is a Finite Impulse Response ("FIR") filter designed for a first Laurent pulse Pulse Amplitude Modulation ("PAM") approach. The matched filter 220 also performs sample rate conversion so that the output thereof is one sample per symbol based on an ideal timing estimate derived by the Doppler-sync recovery component 208. The symbol output from the matched filter 220 is communicated to the symbol rotator 222.

The symbol rotator 222 rotates each successive symbol counter-clockwise an increasing multiple of $\pi/2$ radians to account for the cumulative phase of the Gaussian Minimum Phase Shift Keying ("GMSK") symbols by multiples of $\pi/2$ for a modulation index of h=0.5 GMSK.

The de-rotation of the symbol rotator 222 implements a multiplication of each symbol by unity scaled complex phasors (1, -I, -1, i). The symbol rotator 222 indexes through these four values in a continuous periodic addressing fashion. The result of the de-rotation operations is one of following four possible states for the input (r+iq).

1=>output=$r+iq$ $-i$=>output=$q-ir$ $-1$=>output=$-r-iq$ $I$=>output=$-q+ir$

The output of the symbol rotator 222 is passed to the whitening filter 223.

As noted above, the receiver is non-coherent, and by nature feeds back past symbol decisions to incorporate their contribution to the latest bit time symbol and remove as much of the prior symbols interference with the current symbol (an equalization). This then leaves the future partial response symbol contributions. The whitening filter 223 (combined with the matched filter 220 and the de-rotation operations of the symbol rotator 222) acts as an equalization for the future symbols so that only the immediate past symbols corrupt the current symbol, i.e., interference caused by adjacent symbols is removed as much as possible. Therefore, the whitening filter 223 (or partial-response equalization) allows the RSSE/DFE demodulator 224 to make as close to a maximum likelihood symbol decision as possible given the symbol span of the filters/equalizers and the RSSE/DFE.

In some scenarios, the whitening filter 223 is developed using a spectral factorization of a z-transform of a channel response. The whitening filtration process begins with an auto-correlation of a matched filter. The real auto-correlation process is defined by the following mathematical equation (6).

$$\rho(k) = \frac{1}{R}\sum_m h_{MF}(m)h_{MF}(m+k) \qquad (6)$$

where m and k represent sample time indices (e.g., m=1, 2, ..., M and k=-(N-1), ..., 0. 1 ... (N-1)), $h_{MF}$ represents coefficients of a real matched filter which is a GMSK pulse shape from a Laurent expansion or other suitable representation, and R represents an over sampling factor. $h_{MF}$ is assumed to be at the over-sampling factor R time sampling rate (i.e., =R*symbol rate). $\Sigma_m$ means the sum over all values for m for which the terms are non-zero (and assuming $h_{MF}(k)$=0 for k<1 and k>M.

The auto-correlation is then down-sampled to a symbol rate and de-rotated as shown by the following mathematical equation (7).

$$\tilde{p}(n)=(-i)^n p(n) \qquad (7)$$

The Z-transform of the de-rotated channel auto-correlation is therefore given by:

$$R(z) = z^{-n_0} \sum_n z^n \tilde{p}(n) \qquad (8)$$

where $n_0$ is an index of a maximum response of the auto-correlation. Since R(z) is Hermetian symmetric, it follows that if p is a pole of the oversampling factor R then so is 1/p. Accordingly, the spectral factorization is expressed as:

$$R(z)=F(z)F^*(z^{-1}) \qquad (9)$$

where F(z) is an L-degree polynomial which has roots ($p_1, p_2, \ldots, p_L$) and $F^*(Z^{-1})$ has roots $\{1/p_1^*, 1/p_2^*, \ldots, 1/p_L^*\}$. The whitening filter associated with R(z) has the z-transform $$\Sigma_k z^{-k} h_w(k)=1/F^*(z^{-1}). \qquad (10)$$

Since there are two choices for each pole with each choice for the L-poles resulting in identical magnitude response but a different phase, the minimum phase choice is chosen. Thus, the poles inside the unit circle are also chosen. In effect, stability and physical realizability is guaranteed.

Figure 5:
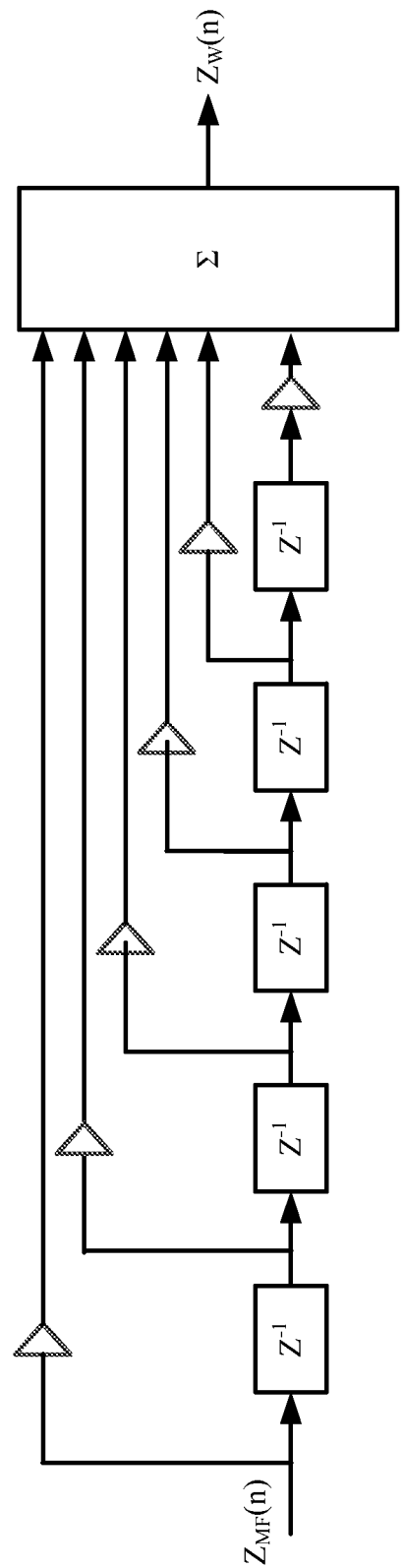
FIG. 5 is an illustration of an exemplary architecture for a whitening filter.

In view of the forgoing, the whitening filter 223 removes the correlation in a noise component introduced by the matched filter in the channel at the filter's input. A more detailed illustration of an exemplary architecture for the whitening filter 223 is provided in FIG. 5. As shown in FIG. 5, the whitening filter 223 comprises a six tap FIR filter. FIR filters are well known in the art, and therefore will not be described herein. The whitening filter input $Z_{MF}(n)$ is the de-rotated matched filter output samples. The present invention is not limited to the particulars of FIG. 5.

Referring again to FIG. 2, the output of the whitening filter 223 is passed to the DFE demodulator 224. The DFE demodulation is treated in a non-coherent fashion to alleviate the stringent carrier frequency recovery accuracy requirement of a partial-response coherent Continuous Phase Modulation ("CPM") demodulator in this Doppler scenario. The DFE demodulation produces soft-decision and hard-decision bit state estimates using a plurality of bit samples in a linear feedback equalizer for the 2-ary symbols (-1, 1). The linear feedback equalizer is developed using a metric dependent upon the minimum-phase feedback channel response based branch metric as defined in the sequel.

In some cases, the DFE demodulator/equalizer can be replaced with an RSSE demodulator/equalizer. The DFE can be viewed as a limiting case of RSSE when RSSE is configured in its most simplistic form. In the context of RSSE and Trellis processing, a number of methods for deriving soft decision information can be used as will be apparent to one skilled in the art. Such methods include, but are not limited to, methods that are similar to methods commonly referred to as Soft Output Viterbi Algorithm ("SOVA") and Soft Decision Viterbi Equalizer ("SDVE") when used in the context of classical full-state Viterbi equalization or decoding.

Figure 6:
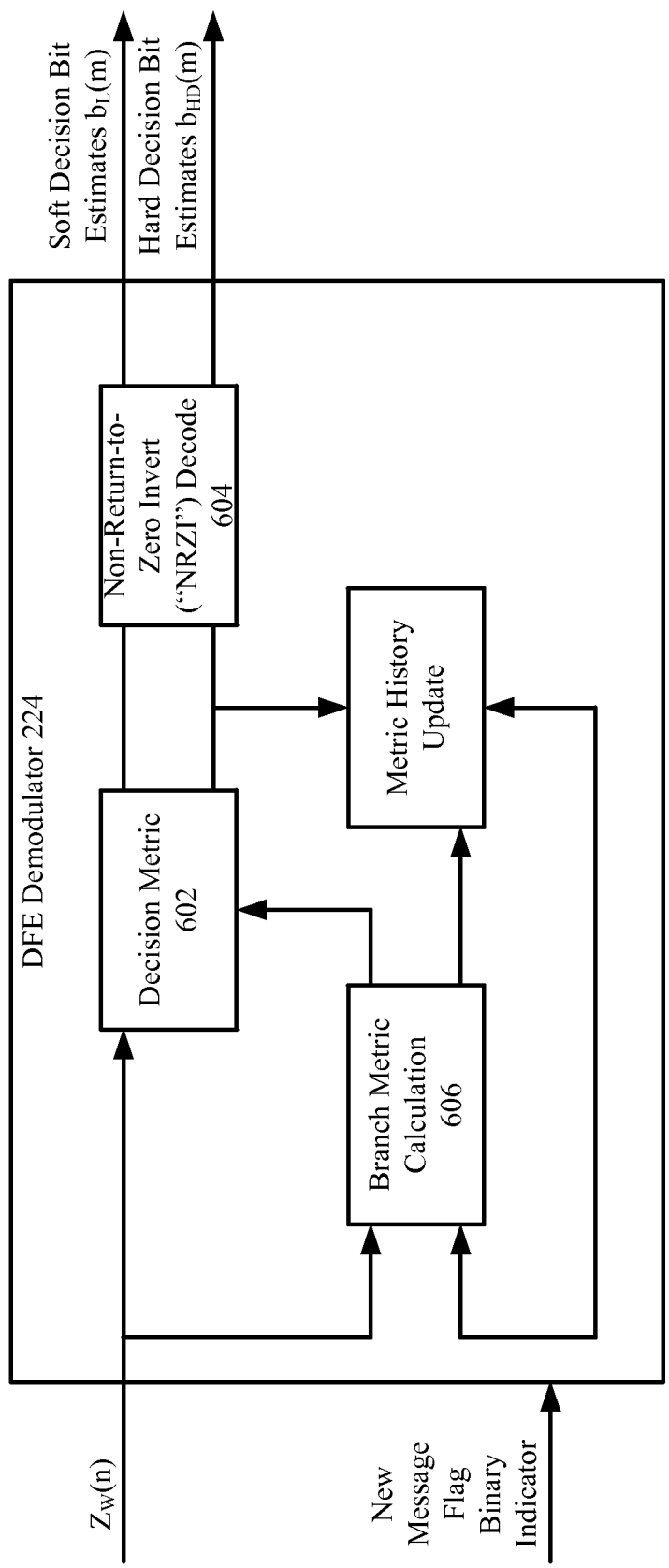
FIG. 6 is an illustration an exemplary architecture for a DFE demodulator.

A more detailed functional diagram of the DFE form of the general RSSE demodulator 224 is provided in FIG. 6. As shown in FIG. 6, the DFE demodulator 224 has two inputs. A first input comprises samples $Z_W(n)$ output from the whitening filter 223. The second input is a new AIS message flag binary indicator indicating the start of a new AIS message. The DFE demodulator 224 provides two outputs as mentioned above. A first output comprises soft decision bit estimates $b_L(m)$ for each bit of an AIS message. A second output comprises hard decision bit estimates $b_{HD}(m)$ for each bit of an AIS message.

The soft and hard decisions are generated by decision metric functions 602 and Non-Return-to-Zero Invert ("NRZI") decode functions 604 of the DFE demodulator 224. One exemplary implementation of the decision metric functions 602 employed by the DFE demodulator 224 is provided below.

```
f = {f(1), . . . , f(L_wf)} the feedback channel response (minimum phase)
L_wf = 3
N = 5
    for n = 37, . . . , M + L + 3
        z = [z_w(n) z_w(n - 1) z_w(n - 2) . . . z_w(n - N + 1)]
        for I_T = [-1  1]
            l(1) = I_T
            ŷ(k) = Σ_{j=1}^L f(j)l(k + j - 1); k = 2, . . . , N
            ŷ(1) = Σ_{j=1}^L f(j)I(j)
            A_Σ = Σ_{k=2}^N z(k)ŷ*(k)
            a_Σ = |A_Σ|
            λ_n(I_T) = z(1)ŷ*(1)
        end
        b̂_SD(n) = λ_n(1) - λ_n(-1)
        b̂_HD(n) = sign(b̂_SD(n))
    end
```

The NRZI decode function 604 for making hard decisions is defined by the following mathematical equations (11) and (12).

$$\tilde{u}_c(n) = \text{sign}(c(n)*c(n-2)) \quad (11)$$

$$\tilde{u}_s(n) = (s(n)*s(n-2)) \quad (12)$$

where $c(n)$ represents a hard decision, $\tilde{u}_c(n)$ an NRZI decode output for a hard decision, $s(n)$ represents a soft decision and $\tilde{u}_s(n)$ is an exemplar of a practical approximation to the NRZI decoded output for a soft decision.

The hard decision $c(n)$ is made based on the following branch metric.

$$\lambda_n(c_n) = \left|\sum_{i=0}^{N-1} z_{n-i}\tilde{y}_{n-i}^*\right| - \left|\sum_{i=1}^{N-1} z_{n-i}\tilde{y}_{n-i}^*\right|,$$

where $\tilde{y}_k = \sum_{l=0}^{L-1} f_l c_{k-l}$, $z_k$ – WF output, and $f_1$ is the equivalent minimum phase system response after the WF with "complex derotated" fixed taps and L=3.
So . . .

$\Delta_n = \lambda_n(c_n=+1) - \lambda_n(c_n=-1)$, and $c_n = \text{sign}(\Delta_n)$ where N refers to an implicit phase memory parameter. Similarly, the soft decision $s(n)$ is made based on the following branch metric.

$$\lambda_n(s_n) = \left|\sum_{i=0}^{N-1} z_{n-i}\tilde{y}_{n-i}^*\right| - \left|\sum_{i=1}^{N-1} z_{n-i}\tilde{y}_{n-i}^*\right|,$$

where $\tilde{y}_k = \sum_{l=0}^{L-1} f_l s_{k-l}$, $z_k$ – WF output, and $f_1$ is the equivalent minimum phase system response after the WF with "complex derotated" fixed taps and L=3.
So . . .

$\Delta_n = \lambda_n(s_n=+1) - \lambda_n(s_n=-1)$, and $s_n = (\Delta_n)$

The branch metric computations for the hard and soft decisions are performed in the branch metric calculation functional block 606 of FIG. 6.

In some cases, the NRZI decode output $\hat{u}(n)$ is mapped to bits as follows.

+1→binary 1

−1→binary 0

$\hat{u}(n) = \text{round}(0.5*(1+\tilde{u}(n)))$

An exemplary implementation of the NRZI decode function 604 is provided below.

```
for m = 44:M + L + 3
    b̂_HD(m - 2) = sign(b̂_HD(m)b̂_HD(m - 2))
    b_SD(m - 2) = (b_SD(m)b_SD(m - 2)) >> 1
end
```

In some scenarios, the hard decisions $b_{HD}(m)$ of the NRZI decode functional block 604 are re-mapped as follows.

$b_{HD}(m) = \text{floor}((b_{HD}(m)+1)/2)$

The soft decisions $b_{SD}(m)$ are also converted to binary bit-likelihood estimates by a thresholding operation as follows.

$b_{HD}(m) = (b_{SD}(m) < k_{SD}*D)$ $D = \Sigma_{m=44}^{289} |b_{SD}(m)|$ where $K_{SD}$ is a bit confidence threshold constant.

The soft decision bit estimates $b_L(m)$ and hard decision bit estimates $b_{HD}(m)$ are then passed to the EDAC component 226, as shown in FIG. 2. The EDAC component 226 performs a Cyclic Redundancy Check ("CRC"). CRC is an error-detecting code to detect accidental change to the AIS message data. The result of the CRC is called a CRC syndrome. If the CRC syndrome does not equal zero, then an error correction is attempted. CRC and error correction techniques are well known in the art. Any known or to be known CRC and/or error correction technique can be used herein.

In view of the forgoing, the signal processor 200 implements a plurality of novel concepts. These concepts include: using matched filters to estimate a TOA and Doppler shift of multiple communication signals using a priori training information contained in each AIS message simultaneously across a plurality of ambiguous states; implementing the signal processing in a frequency domain; using a streaming CFAR threshold with a non-coherent RSSE/DFE equalizer; making binary bit likelihoods based on threshold soft-decision bits; using a CRC based correction technique for the soft decisions; and using a last-resort brute force CRC correction technique.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for co-channel separation of communication signals, comprising:
    simultaneously receiving a plurality of communication signals transmitted at disparate relative Doppler frequencies from different locations within a multi-access system;
    performing matched filtering operations to pre-process each of the plurality of communication signals so as to generate pre-processed digitized samples using a priori information contained in pre-ambles of messages present within the plurality of communication signals;
    using estimated signal parameters to detect the plurality of communication signals from the pre-processed digitized samples; and
    demodulating the plurality of communication signals using a Trellis based demodulation technique in which a non-coherent likelihood decision metric is determined and used to produce hard and soft decision binary bit state estimates for each bit of a message.

2. The method according to claim 1, wherein the plurality of pre-processed digitized samples are generated by estimating at least one of the following signal parameters: a signal's Time Of Arrival ("TOA"); a Doppler frequency; a phase; and a Signal-to-Noise Ratio ("SNR").

3. The method according to claim 1, wherein the estimated signal parameters are determined using the a priori information contained in the pre-ambles of the messages.

4. The method according to claim 1, wherein the matched filtering operations are performed in a frequency domain.

5. The method according to claim 1, wherein the a prior information comprises a training sequence and a start flag of an Automatic Identification System ("AIS") message.

6. The method according to claim 1, wherein a Constant False Alarm Rate ("CFAR") technique is used to detect the plurality of communication signals from the pre-processed digitized samples.

7. A method for co-channel separation of communication signals, comprising:
    simultaneously receiving a plurality of communication signals transmitted at disparate relative Doppler frequencies from different locations within a multi-access system;
    performing matched filtering operations to pre-process each of the plurality of communication signals so as to generate pre-processed digitized samples using a priori information contained in pre-ambles of messages present within the plurality of communication signals;
    using estimated signal parameters to detect the plurality of communication signals from the pre-processed digitized samples; and
    demodulating the plurality of communication signals using a demodulation technique exclusive of a classical full-state Viterbi algorithm;
    wherein the plurality of communication signals is demodulated using a Decision Feedback Equalization ("DFE") demodulation technique in which a non-coherent likelihood decision metric is determined and used to produce hard and soft decision binary bit state estimates for each bit of a message.

8. A method for co-channel separation of communication signals, comprising:
    simultaneously receiving a plurality of communication signals transmitted at disparate relative Doppler frequencies from different locations within a multi-access system;
    performing matched filtering operations to pre-process each of the plurality of communication signals so as to generate pre-processed digitized samples using a priori information contained in pre-ambles of messages present within the plurality of communication signals;
    using estimated signal parameters to detect the plurality of communication signals from the pre-processed digitized samples; and
    demodulating the plurality of communication signals using a demodulation technique exclusive of a classical full-state Viterbi algorithm;
    wherein the demodulating is performed by a number of demodulators that is less than that required to span an entire channel instantaneous bandwidth.

9. A system, comprising:
    a signal processing circuit configured to
        simultaneously receive a plurality of communication signals transmitted at disparate relative Doppler frequencies from different locations within a multi-access system,
        perform matched filtering operations to pre-process each of the plurality of communication signals so as to generate pre-processed digitized samples using a priori information contained in pre-ambles of messages present within the plurality of communication signals,
        use estimated signal parameters to detect the plurality of communication signals from the pre-processed digitized samples, and
        demodulate the plurality of communication signals using a Trellis based demodulation technique in which a non-coherent likelihood decision metric is determined and used to produce hard and soft decision binary bit state estimates for each bit of a message.

10. The system according to claim 9, wherein the plurality of pre-processed digitized samples are generated by estimating at least one of the following signal parameters: a signal's Time Of Arrival ("TOA"); a Doppler frequency; a phase; and a Signal-to-Noise Ratio ("SNR").

11. The system according to claim 9, wherein the estimated signal parameters are determined using the a priori information contained in the pre-ambles of the messages.

12. The system according to claim 9, wherein the matched filtering operations are performed in a frequency domain.

13. The system according to claim 9, wherein the a prior information comprises a training sequence and a start flag of an Automatic Identification System ("AIS") message.

14. The system according to claim 9, wherein a Constant False Alarm Rate ("CFAR") technique is used to detect the plurality of communication signals from the pre-processed digitized samples.

15. A system, comprising:
a signal processing circuit configured to
simultaneously receive a plurality of communication signals transmitted at disparate relative Doppler frequencies from different locations within a multi-access system,
perform matched filtering operations to pre-process each of the plurality of communication signals so as to generate pre-processed digitized samples using a priori information contained in pre-ambles of messages present within the plurality of communication signals,
use estimated signal parameters to detect the plurality of communication signals from the pre-processed digitized samples, and
demodulate the plurality of communication signals using a demodulation technique exclusive of a classical full-state Viterbi algorithm;
wherein the plurality of communication signals is demodulated using a Decision Feedback Equalization ("DFE") demodulation technique in which a non-coherent likelihood decision metric is determined and used to produce hard and soft decision binary bit state estimates for each bit of a message.

16. A system, comprising:
a signal processing circuit configured to
simultaneously receive a plurality of communication signals transmitted at disparate relative Doppler frequencies from different locations within a multi-access system,
perform matched filtering operations to pre-process each of the plurality of communication signals so as to generate pre-processed digitized samples using a priori information contained in pre-ambles of messages present within the plurality of communication signals,
use estimated signal parameters to detect the plurality of communication signals from the pre-processed digitized samples, and
demodulate the plurality of communication signals using a demodulation technique exclusive of a classical full-state Viterbi algorithm;
wherein the demodulating is performed by a number of demodulators that is less than that required to span an entire channel instantaneous bandwidth.

* * * * *